United States Patent
Nunes

(10) Patent No.: US 10,247,212 B2
(45) Date of Patent: Apr. 2, 2019

(54) DEVICE FOR MOUNTING AN OBJECT

(71) Applicant: Lawrence E. Nunes, Martinez, CA (US)

(72) Inventor: Lawrence E. Nunes, Martinez, CA (US)

(*) Notice: Subject to any disclaimer, the term of this patent is extended or adjusted under 35 U.S.C. 154(b) by 4 days.

(21) Appl. No.: 15/662,060

(22) Filed: Jul. 27, 2017

(65) Prior Publication Data

US 2019/0032688 A1    Jan. 31, 2019

(51) Int. Cl.
| | | |
|---|---|---|
| *B65D 33/16* | (2006.01) | |
| *F16B 2/22* | (2006.01) | |
| *A45F 5/02* | (2006.01) | |
| *B60R 11/00* | (2006.01) | |

(52) U.S. Cl.
CPC ............. *F16B 2/22* (2013.01); *A45F 5/02* (2013.01); *A45F 5/021* (2013.01); *B60R 11/00* (2013.01); *B60R 2011/001* (2013.01); *B60R 2011/0071* (2013.01)

(58) Field of Classification Search
CPC .. A45F 5/10; A45F 5/1026; A45F 2005/1033; A45F 2005/104; A45F 5/1046; A45F 2005/1053; A45F 2005/106; A45F 2005/1073; A45F 2005/1066
See application file for complete search history.

(56) References Cited

U.S. PATENT DOCUMENTS

| | | | | |
|---|---|---|---|---|
| 381,265 | A * | 4/1888 | Martens | B65D 33/1675 24/30.5 R |
| 609,989 | A * | 8/1898 | Gans | B65D 33/1675 24/30.5 R |
| 3,664,224 | A * | 5/1972 | Campagna, Jr. | G10G 5/00 248/230.8 |
| 4,212,303 | A * | 7/1980 | Nolan | A61B 17/122 606/120 |
| 4,523,353 | A * | 6/1985 | Hubbard | A61F 7/103 24/30.5 R |
| 4,624,496 | A * | 11/1986 | Bengtson | A63C 11/023 211/34 |
| 4,656,697 | A * | 4/1987 | Naslund | B65D 33/1675 24/30.5 P |
| 4,663,807 | A * | 5/1987 | Bozzo | B65D 33/1675 24/16 PB |
| 4,796,936 | A * | 1/1989 | Sherin | A45F 5/10 294/148 |
| 4,832,393 | A * | 5/1989 | Pitchford | A44B 11/10 24/196 |
| 4,847,956 | A * | 7/1989 | Levine | B65D 33/1675 24/30.5 R |
| 4,976,277 | A * | 12/1990 | Yasuda | A45D 8/24 132/279 |
| 5,050,272 | A * | 9/1991 | Robinson | B65D 33/1675 24/30.5 R |
| 5,356,426 | A * | 10/1994 | Delk | A61F 7/103 607/112 |
| 5,598,608 | A * | 2/1997 | Naslund | B65D 33/1675 24/30.5 P |

(Continued)

*Primary Examiner* — Jason W San
(74) *Attorney, Agent, or Firm* — Theodore J. Bielen, Jr.

(57) ABSTRACT

A device for holding an object to a support utilizing a base member that is connected to a resilient body via a connection mechanism. An arm is hingedly connected to the base member and possesses a surface for mounting an object. The base member and resilient body fit over a support.

7 Claims, 5 Drawing Sheets

(56) References Cited

U.S. PATENT DOCUMENTS

| | | | | |
|---|---|---|---|---|
| 5,604,959 | A * | 2/1997 | Bowen | B65D 33/1675 24/30.5 R |
| 5,735,022 | A * | 4/1998 | Niedecker | B65B 51/04 24/30.5 R |
| 5,887,550 | A * | 3/1999 | Levine | A01K 27/004 119/796 |
| 5,904,388 | A * | 5/1999 | Seibel | A45C 13/28 294/141 |
| 6,167,592 | B1 * | 1/2001 | Tsai | A45C 13/26 16/411 |
| 6,176,378 | B1 * | 1/2001 | Neubauer | A47G 25/00 211/113 |
| 6,257,251 | B1 * | 7/2001 | Burleson | A45D 8/24 132/279 |
| 6,446,638 | B1 * | 9/2002 | Horman | A45D 8/24 132/275 |
| 6,904,646 | B2 * | 6/2005 | Reynolds | B65D 33/1675 24/30.5 R |
| 6,957,914 | B2 * | 10/2005 | Arends | B65D 33/06 383/204 |
| 7,062,822 | B2 * | 6/2006 | Folkmar | A44B 99/00 24/30.5 R |
| 7,506,415 | B2 * | 3/2009 | Brian | A41B 11/002 24/329 |
| 8,888,667 | B2 * | 11/2014 | Lee | F16B 2/10 24/327 |
| 9,138,888 | B1 * | 9/2015 | Worden | B25G 3/38 |
| 9,427,037 | B1 * | 8/2016 | Atherton | A41H 37/00 |
| 2005/0120521 | A1 * | 6/2005 | Folkmar | B65D 33/1675 24/30.5 R |
| 2006/0017300 | A1 * | 1/2006 | Erickson | A45F 5/102 294/171 |
| 2006/0026794 | A1 * | 2/2006 | Streetman | A45C 13/262 16/110.1 |
| 2006/0026889 | A1 * | 2/2006 | Hacker | A01K 97/14 43/5 |
| 2006/0087139 | A1 * | 4/2006 | Ayres | A45F 5/1026 294/137 |
| 2006/0272595 | A1 * | 12/2006 | Edwards | A01K 27/006 119/795 |
| 2007/0278807 | A1 * | 12/2007 | Jenkins | A45F 5/1026 294/159 |
| 2009/0174203 | A1 * | 7/2009 | Kim | A45F 3/14 294/156 |
| 2012/0280524 | A1 * | 11/2012 | Izzo | A45F 5/10 294/137 |
| 2013/0305540 | A1 * | 11/2013 | Ruddell | B65D 33/25 30/123 |
| 2014/0116585 | A1 * | 5/2014 | Kimmel | A45F 5/10 150/106 |
| 2014/0166832 | A1 * | 6/2014 | Briant | F16M 11/041 248/205.1 |
| 2016/0068308 | A1 * | 3/2016 | Johansson | B65D 33/1675 383/68 |
| 2017/0099936 | A1 * | 4/2017 | Day | A45F 5/10 |
| 2017/0184140 | A1 * | 6/2017 | Giannatti | F16B 2/10 |

* cited by examiner

DEVICE FOR MOUNTING AN OBJECT

The present application is a divisional application of U.S. patent application Ser. No. 15/140,340 filed 27 Apr. 2016.

BACKGROUND OF THE INVENTION

The present invention relates to a novel and useful device for holding an object.

The carrying of objects by a person has spawned the creation of numerous carrying items such as, bags, cases, holsters, and the like. In most cases, such carrying or toting items are grasped by the hand or hands of the user, supported by the shoulder or shoulders of the user, tied to the user's torso, and the like. In addition, hooks or clips, such as carabineers may also be used to attach carrying items to persons and other supports, on a temporary basis.

In the past, many carrying and retaining devices have been devised to hold particular items. For example, U.S. Pat. No. 4,190,182 shows a hand carrier for ski poles utilizing a gripped member that is connected by a hinge to a pair of clip holders for each of the ski poles.

U.S. Pat. No. 7,216,788 shows a tool holder utilizing a mounting portion that fits on a belt which connects to a clip holding a measuring tape.

U.S. Pat. Nos. 4,883,290, 7,267,254, and 7,806,263 describe clip attachments for a belt or the like that includes depending portions utilized to hold elongated objects such as poles, containers, and the like.

U.S. Pat. Nos. 4,699,303, 5,232,136, and 5,452,830 show clip holders that fit over a belt or a similar item and possessing a lower platform for supporting items such as, golf tees, tools, knifes, and the like.

U.S. Pat. No. 5,571,228 teaches a holder for supporting a fishing rod which takes the form of a clip fitting to a belt and a pair of tabs that extend upwardly to support the fishing pole.

A device for holding objects that is versatile and may be used in a temporary or permanent manner would be a notable advance in the field of containers and packages.

SUMMARY OF THE INVENTION

In accordance with the present invention a novel and useful device for holding objects is herein provided.

The device of the present invention is intended to hold an object or objects to a support, be it mobile or stationary. One of the elements of the device takes the form of a clip which is engageable with a support. Such engagement takes place by the placement of the clip over the support or through such placement combined with a spring portion formed in the clip.

A base is also found in the present holding device and is connected to the clip. The base possesses a surface that faces outwardly from the base. First and second flanges extend from the base and are spaced or gapped from the base and include free ends that are spaced from one another. Thus, the first and second flanges take the form of a pair of flaps extending from the base.

A flexible sheath is also employed in the present device. Such flexible sheath is provided with at least first and second passageways for encompassing at least a portion of each of the first and second extended flanges. When in place around the first and second flanges, the flexible sheath occupies at least a portion of the gaps between the first and second flanges and the base. The object being carried by the device of the present invention is intended to be mounted, contacted or otherwise connected to the flexible sheath when such flexible sheath is in place on the first and second flanges. Moreover, the first and second passageways of the flexible sheath may form a continuous chamber within the flexible sheath.

In addition, the base may further be formed with first and second hooks. With respect to such aspect of the present invention, the flexible sheath would be fitted with first and second loops that may be flexible or resilient members. The first and second loops would engage the first and second hooks of the base, when the first and second flanges are encompassed in the first and second passageways of the sheath.

The clip may be further formed with a handgrip to allow the user to easily manipulate the device of the present invention. The handgrip may further be formed with an aperture to allow the hand of the user to extend through a portion of a clip, further easing the holding and maneuvering of the device of the present invention.

It may be apparent that a novel and useful device for holding an object to a support has been herein above described.

It is therefore an object of the present invention to provide a device for holding an object to a support that is easily mounted to the support by the use of a clip which may be spring loaded.

Another object of the present invention is to provide a device for holding an object to a support that is capable of mounting a large variety of objects temporarily or permanently to the device of the present invention.

Another object of the present invention is to provide a device for holding an object to a support which is relatively simple to manipulate in conjunction with a support.

A further object of the present invention is to provide a device for holding an object to a support that may be stationary or mobile.

Yet another object of the present invention is to provide a device for holding an object to a support that may be constructed using a minimal number of parts in the formation of such device of the present invention.

Another object of the present invention is to provide a device for holding an object to a support that is adaptable for use with objects of considerable bulk and weight.

The invention possesses other objects and advantages especially as concerns specific features thereof which will become apparent as the specification continues.

Figure 1:
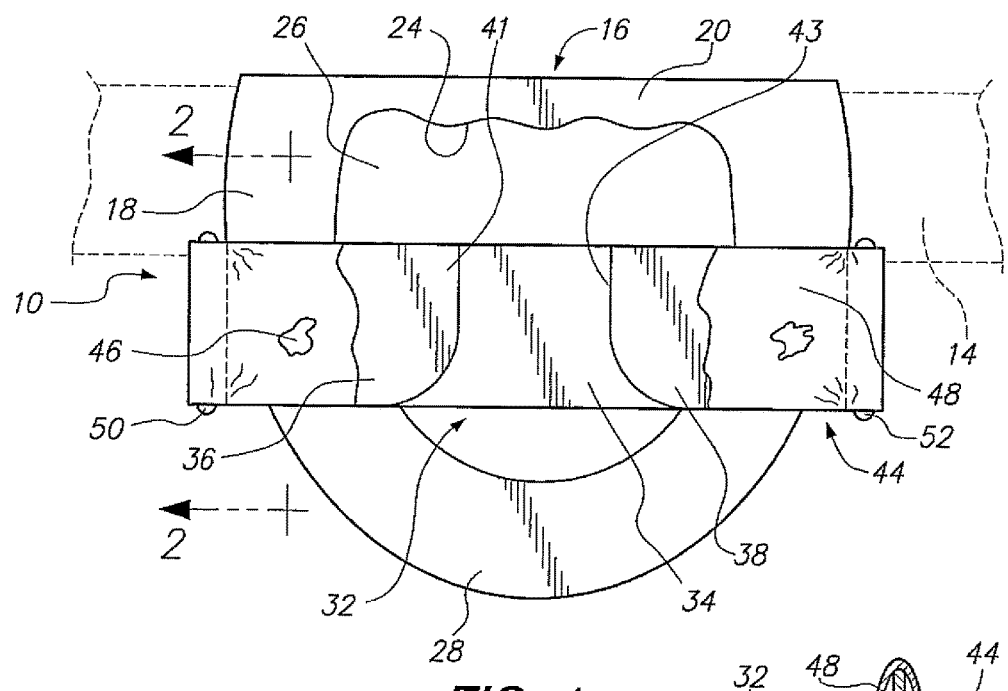
FIG. 1 is a front elevational view of the device of the present invention with a broken away portion of the flexible sheath revealing a pair of flanges.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

The device, as a whole, as shown in the drawings is identified by reference character 10A. Device 10A is intended for holding an object 12, represented in phantom on FIG. 3, to base support 14, represented by phantom on FIG. 1. Support 14 may take the form of any stationary or mobile item such as a wall, a rack, a trouser belt, a clothing flap, a steering wheel, a tool carrier, handle and the like. Likewise, object may be any of the items associated with support 14 such as tools, a bag or satchel an ammunition bag, a flashlight holster, a child's supply bag, and the like.

Figure 5:
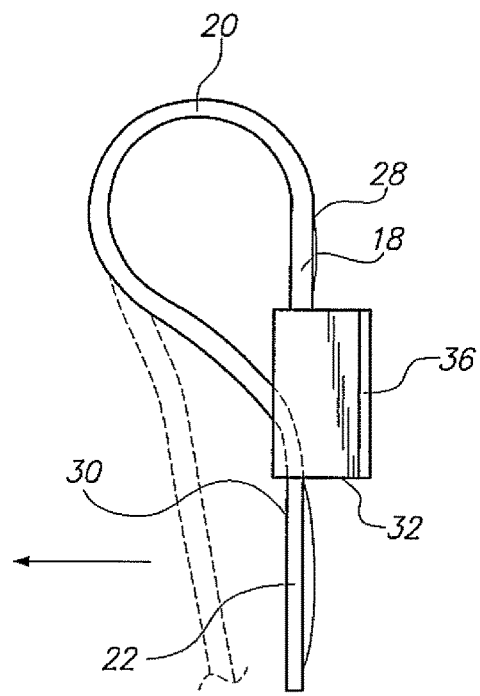
FIG. 5 is a left side elevational view of the device of the present invention with the spring action of the clip being illustrated in phantom.

Device 10A includes as one of its elements a clip 16. Clip 16 may be formed of any sturdy materials such as, metal, plastic, composite and the like. The clip is formed with a first portion 18 that is connected by an intermediate portion 20 to a second portion 16 which is intended to extend over support 14. Second portion 22 may exhibit springiness due to the construction of clip 16 from resilient material such as metal, or plastic. FIG. 5 illustrates the springy movement of second portion 22 in relation to first portion 18 of clip 16, in this regard. Clip 16 is also formed with a grip surface 24 which may be a serpentine or serrated edge. Aperture 26 extends through clip 16 to allow the hand of the user to more easily position and manipulate device 10A and to allow clip 16 to be hung over a support 14. Surfaces 28 and 30 of clip 16 may be curved to contour to the surface of support 14, which, in certain cases, may be the contour of a portion of the human anatomy.

Figure 4:
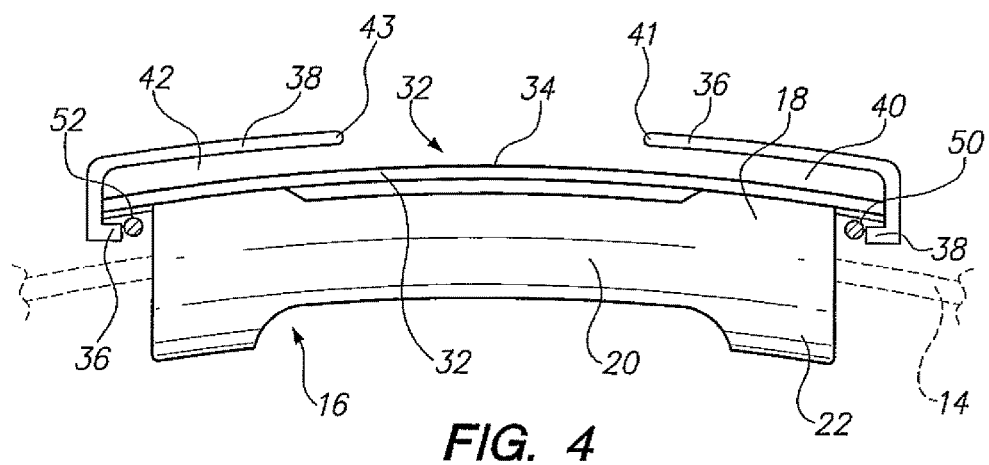
FIG. 4 is a top plan view of the device of the present invention, without the flexible sheath of FIG. 3 and showing a support as being depicted in phantom.

Referring again to FIGS. 1 and 2, it may be observed that device 10A is also constructed with a base 32 that is connected to or formed integrally with clip 16. Base 32 includes a surface or face 34 that is presented outwardly from clip 16. Surface 34, again, may have a curved configuration akin to surface 28 of clip 16, similar to the surface of a round bin or round bucket. With reference to FIG. 4, it may be seen that base 32 terminates in hooks 36 and 38, the purpose of which will be discussed hereinafter.

Turning again to FIGS. 1 and 4, it may be apparent that device 10 also includes a first flange 36 and a second flange 38. First and second flanges 36 and 38 extend from base 32 and form first and second gaps 40 and 42 relative to base 32. In addition, first and second flanges 36 and 38 are provided with free ends 41 and 43.

Figure 2:
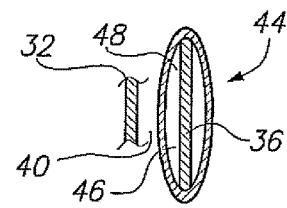
FIG. 2 is a sectional view taken along line 2-2 of FIG. 1.
Figure 3:
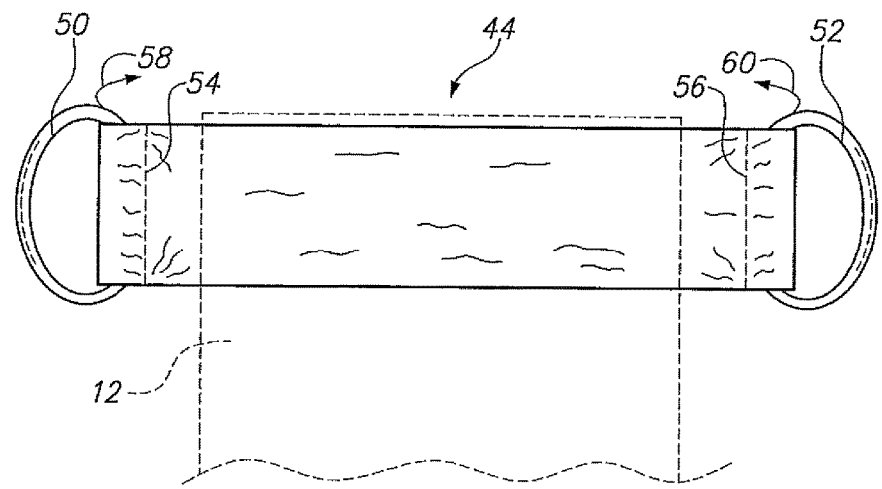
FIG. 3 is a front elevational view of the flexible sheath having end loops, shown in place on FIG. 1.

Another element of device 10A takes the form of a flexible sheath 44, which is depicted in place on flanges 36 and 38 in FIG. 1 and apart from clip 16 and flanges 36 and 38 on FIG. 3. Flexible sheath 44 may be formed of any flexible material such as cloth, rubber, mesh, and the like. Sheath 44 is provided with a first passageway 46 and a second passageway 48. As depicted in FIG. 2, passageway 46 extends completely through sheath 44 and is contiguous with passageway 48. Flexible sheath 44 is fitted upon first and second flanges 36 and 38 such that flange 36 is encompassed or lies within passageway 46, while flange 38 is encompassed or lies within passageway 48 of flexible sheath 44. In this configuration, flexible sheath 44 would occupy at least a portion of gaps 40 and 42 appearing between flanges 36 and 48 and base 32. In other words, sheath 44 occupies gap 42 between flange 38 and base 32 in a similar manner to that illustrated in FIG. 2 with respect to gap 40 located between flange 36 and base 32.

Flexible sheath 44 is also fashioned with loops 50 and 52 that may be formed of resilient material. As depicted in FIG. 3, loops 50 and 52 are constructed of rounded resilient cordage material that are fixed to flexible sheath 44 along sew lines 54 and 56, respectively. Loops 50 and 52 engage hooks 38 and 36, respectively, the anchoring sheath 44 relative to base 32, directional arrows 58 and 60. Such anchoring takes place when flanges 36 and 38 occupy passageways 46 and 48, respectively, of sheath 44. Loops 50 and 52 are depicted on FIG. 1 in-section, apart from sheath 44, for the sake of clarity. Again, referring to FIG. 3, the object 12 being supported by device 10A would connect or contact flexible sheath 44. Needless to say, such object 12 maybe slipped over or around sheath 44, or sewed or riveted thereto in a permanent fashion.

Figure 6:
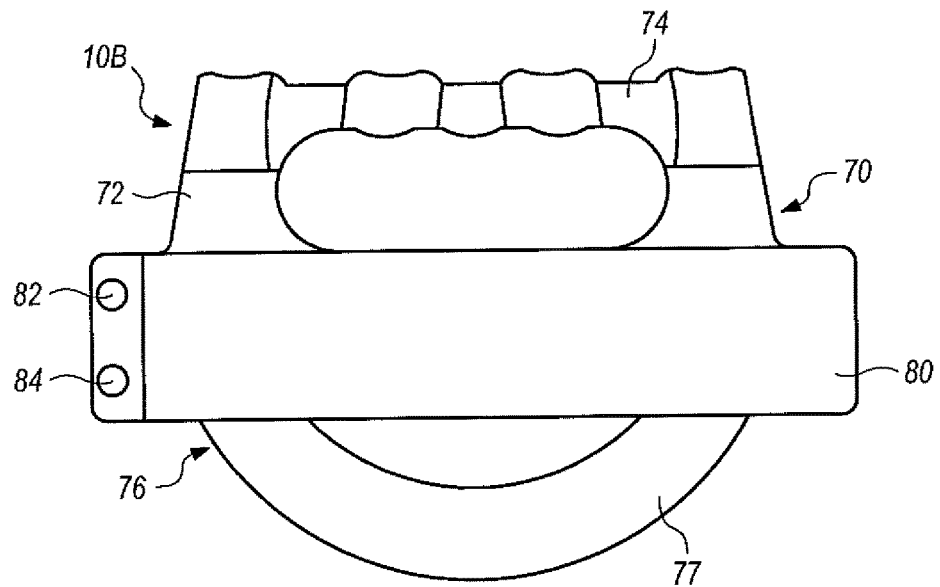
FIG. 6 is a front elevational view of another embodiment of the device of the present application.
Figure 7:
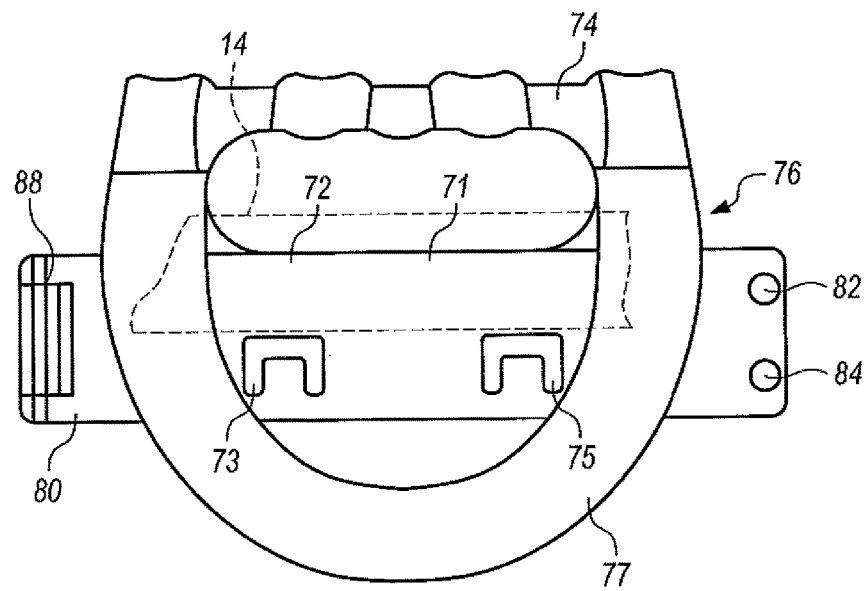
FIG. 7 is a rear elevational view of the embodiment of FIG. 6.
Figure 8:
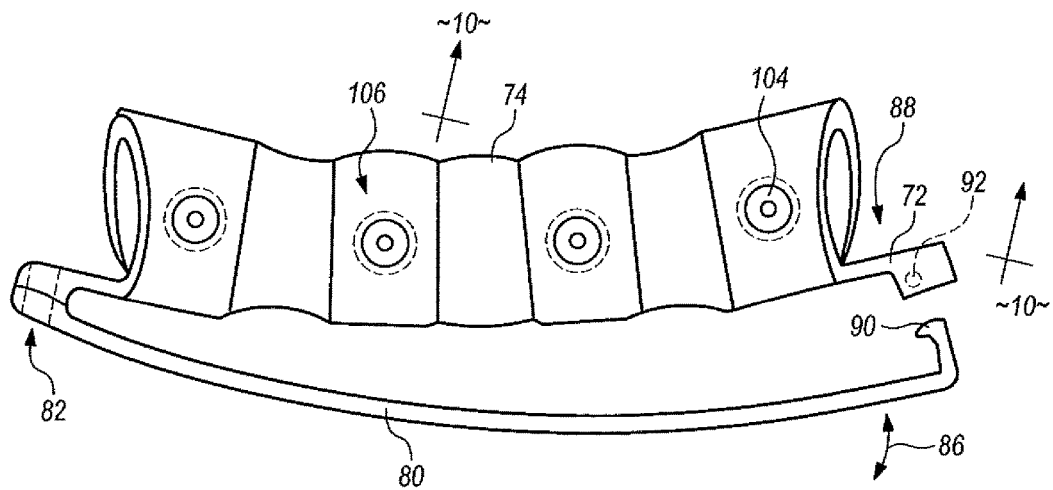
FIG. 8 is a top plan view of the embodiment depiction of FIG. 0.6.

Viewing now FIGS. 6-12, it may be observed that another embodiment 10B of the device of the present application is depicted. Device 10B is intended to be used in a similar manner to device 10A. However, device 10B is formed with a base member 70. Base member 70 includes a first body 72 and an extension 74 projecting therefrom. Surface 71 of first body 72 includes tabs 73 and 75 for partially guiding support 14, FIG. 7. Extension 74 is generally curved and elongated as shown in FIG. 6.

Also, device 10B is formed with a second resilient body 76 which is shaped in the form of a partial ring 77. Second resilient body terminates in a sleeve 78, the purpose of which will be discussed hereinafter, best shown in FIG. 9.

In addition, device 10B is fashioned with an arm 80. Arm 80 is attached to first body 72 by a hinge 82 formed by a pair of rivets 84 creating a degree of tolerance between arm 80 and first body 72. In addition, arm 80 possesses a certain degree of flexibility to allow movement back and forth relative to first body 72, according to directional arrow 86, FIG. 8. Moreover, a latch 88 removably fixes arm 82 to first body 72, FIGS. 7 and 8. Latch 88 includes a hook 90 that fits into a receiver 92, clearly depicted in FIG. 11. Directional arrow 94, FIG. 11, also indicates such back and forth movement and fixing and removal of arm 80 from first body 72.

Figure 9:
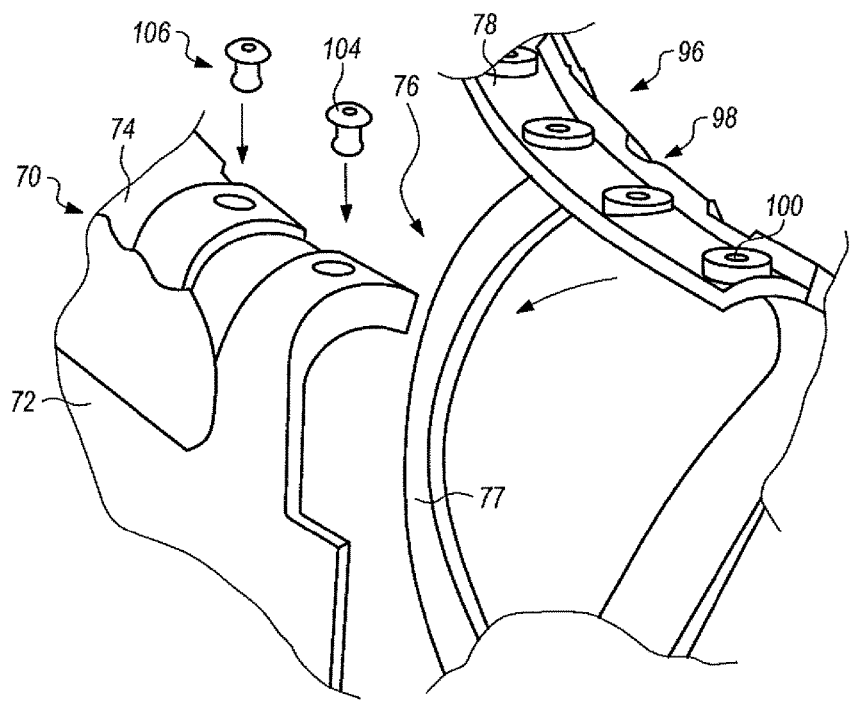
FIG. 9 is a partial exploded view of two elements of the embodiment of FIG. 6, absent the rotatable arm.
Figure 10:
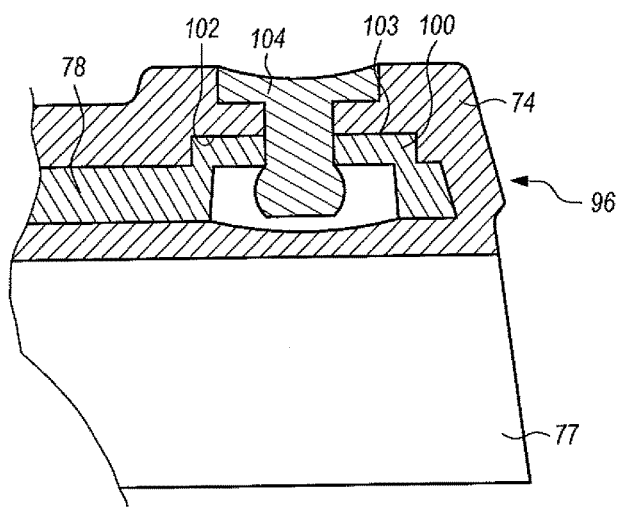
FIG. 10 is a sectional view taken along line 10-10 of FIG. 8.
Figure 11:
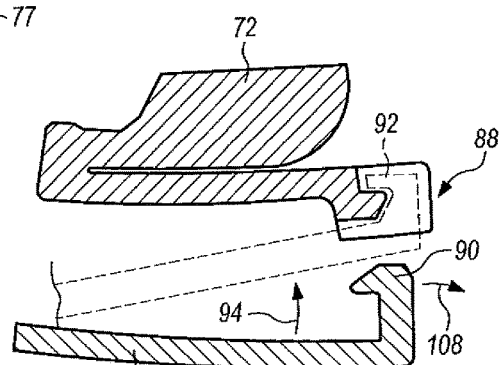
FIG. 11 is a sectional view of the latch between the arm and first body of the device of FIG. 6.
Figure 12:
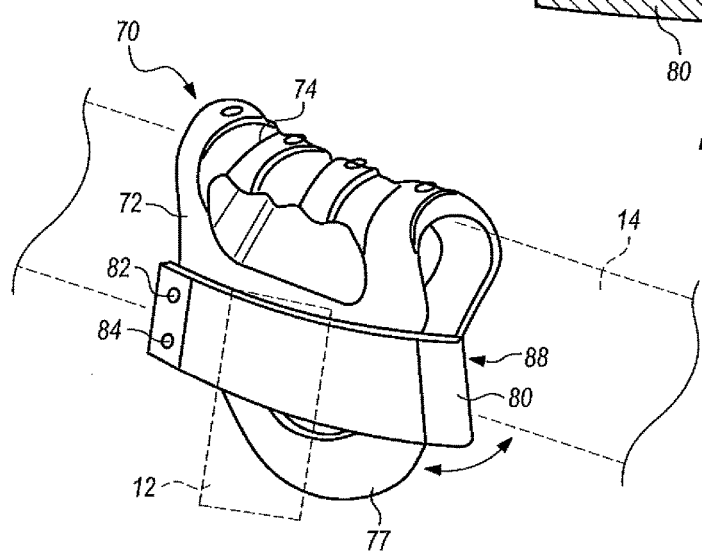
FIG. 12 is a top right side perspective view of the device of FIG. 6.

With reference to FIGS. 9, 10, and 12, it may be apparent that device 10B also utilizes a connection mechanism 96 for mating extension 74 of first body 72 of base member 70 to second resilient body 76. Connection mechanism 96 includes the provision of a plurality of bosses or protrusions 98 extending from sleeve 78, FIG. 9. With reference to FIG. 10, it may be observed that a single boss 100 of plurality of bosses 98 is shown as fitting into a recess 102 in extension 74 of first body 72. It should be noted that recess 102 represents an exemplar of a plurality of recesses found in extension 102 that fit plurality of bosses 98. A rivet 104 secures extension 74 of first body 72 to its sleeve 78 of second resilient body 76. Rivet 104 is one of a plurality of rivets 106 depicted in the drawings, each one of which secures one of the plurality of bosses 98 to a particular recess in extension 74, typified by recess 102, FIG. 10. It should be noted that via this structure, boss 100 nested within recess 102, contacts the surface 103 of recess 102 to receive stress and divert stress from connector or rivet 104, due to any relative movement between first body 72 and second resilient body 76.

In operation, the user of device 10A would fasten or connect the same to a support 14, which may be a trouser belt, a steering wheel, a chair, a rack, tool handle, handle bar and the like. The object 12 being held by device 10 would be connected or placed over flexible sheath 44. In the case of a temporary connection of object 12 to flexible sheath 44, flexible sheath 44 would be connected to first and second flanges 36 and 38 by positioning of the same into first and second passageways 46 and 48 of flexible sheath 44. The following such placement first and second flanges 36 and 38 within flexible sheath 44, resilient loops 50 and 52 would be swung around base 32, directional arrows 58 and 60 on FIG. 3, to engage hooks 38 and 36, respectively. Thus, sheath 44 is firmly held to base 32 in order to carry object 12, which may take the form of a bag, holster, satchel, day pack, and the like.

In the case of embodiment 10B, once assembled according to FIGS. 9 and 10, a support 14 fits between first body 72 of base member 70 and second resilient body 76 and guides on tabs 71 and 73, FIG. 12. Arm 80 may be latched or unlatched according to directional arrow 94 and directional arrow 108 of FIG. 11. An item 12 or multiple items may be supported by arm 80 and are handy for use by the user of device 10B.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for mounting an object, comprising:
a base member, said base member comprising first body and an extension projecting therefrom;
a second resilient body; a connection mechanism for mating said extension of said base member and said second resilient body, said connection mechanism comprising; a sleeve formed on said second resilient body having a plurality of bosses extending therefrom, and a plurality of recesses in said extension of said base member, at least one of said plurality of bosses nesting in one of said plurality of recesses in said extension of said first body, said connection mechanism further comprising a connector, said connector being configured to bind said at least one of said plurality of bosses of said resilient body to said one of said plurality of recesses in said extension; an arm; and a hinge for attaching said arm to said first body said arm including a surface configured for mounting the object.

2. The device of claim 1 in which said second resilient body comprises a partial ring.

3. The device of claim 1 which further comprises a latch for removably fixing said arm to said base member.

4. The device of claim 1 in which said arm comprises a curved member.

5. The device of claim 1 in which said connector comprises a rivet.

6. The device of claim 3 in which said arm comprises a curved member.

7. The device of claim 3 in which said connector comprises a rivet.

* * * * *